R. PALMER.
SINTERING APPARATUS.
APPLICATION FILED FEB. 10, 1909.

942,513.

Patented Dec. 7, 1909.

Witnesses:
Irving E. Steers.
J. Ellis Glen

Inventor
Robert Palmer,
by Albert G. Davis
Att'y.

UNITED STATES PATENT OFFICE.

ROBERT PALMER, OF LARCHMONT, NEW YORK, ASSIGNOR TO GENERAL ELECTRIC COMPANY, A CORPORATION OF NEW YORK.

SINTERING APPARATUS.

942,513.  Specification of Letters Patent.  Patented Dec. 7, 1909.

Application filed February 10, 1909. Serial No. 477,181.

*To all whom it may concern:*

Be it known that I, ROBERT PALMER, a citizen of the United States, residing at Larchmont, county of Westchester, State of New York, have invented certain new and useful Improvements in Sintering Apparatus, of which the following is a specification.

The highly refractory metals, such as tungsten, molybdenum, tantalum, and the like, are compacted into a homogeneous body of metal with the greatest difficulty. One method of procedure consists in first obtaining a loosely coherent body of metal, either by pressing the fine metal powder into a mold, or by uniting the metal particles into a coherent body by means of a binder, which can be later removed. This body of metal is then further treated by subjecting it to a high temperature, as by the passage of an electric current, which causes the particles to weld or sinter together, the body meanwhile shrinking in volume and becoming compact and dense.

My invention relates to an apparatus for sintering bodies of this kind, and more especially comparatively thick wires and rods of highly refractory metal, which require the expenditure of several kilowatts of energy. The clamps, which serve to hold the wires or rods and conduct current to the same, are artificially cooled which prevent fusion of the same at the points of contact with the bodies to be sintered. The rods are supported in such a manner that it is possible for them readily to draw together, or shrink, when sintering. The weight of the movable clamp is counter-balanced by means of a float displacing a body of heavy liquid, preferably a conductive liquid, such as mercury. This expedient avoids the possibility of the sintering rod being pulled apart when in a plastic state. The operation is carried on in a vacuum, or a suitable gas, within a metallic envelop, which can rapidly absorb and dissipate the great amount of heat which is generated. The envelop is provided with a suitable window, so as to enable the operator to observe and regulate the temperature to which the body is raised.

The novel features of my invention are pointed out more specifically in the appended claims.

Figure 1:
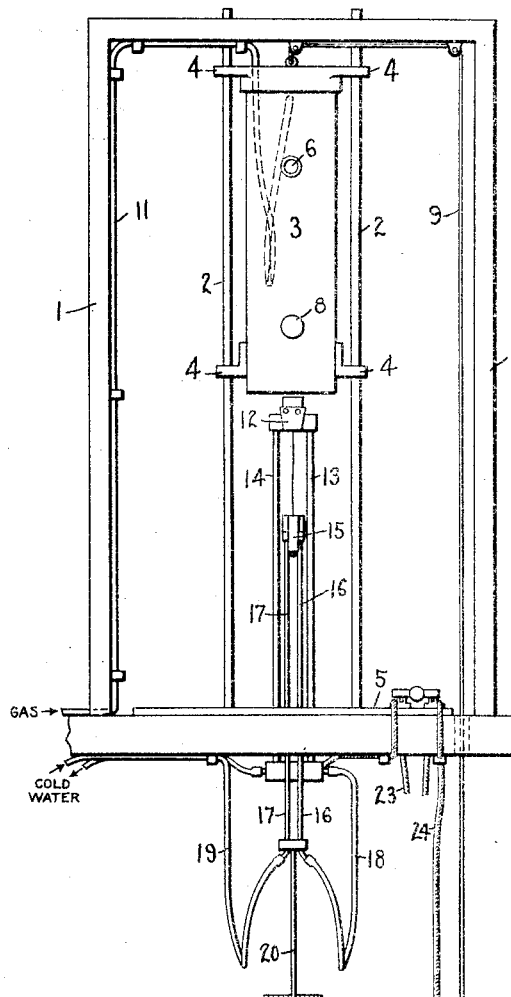
Figure 2:
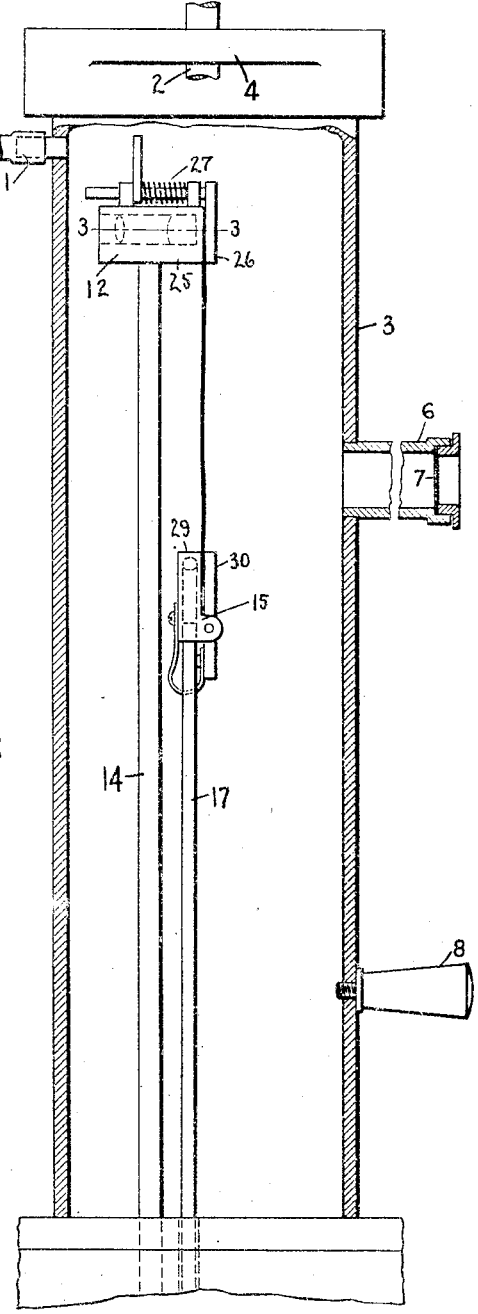
Figure 3:
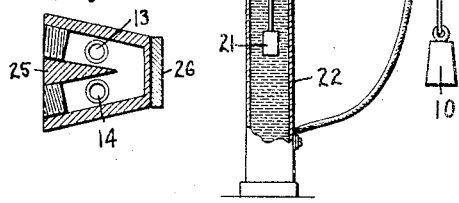

In the accompanying drawings, Figure 1 is an elevational view partly in section of the sintering apparatus; Fig. 2 is a sectional view of the treating envelop taken at right angles to the plane of Fig. 1; and Fig. 3 is a cross-section through the line 3—3 of the upper supporting clamp shown in Fig. 2.

Referring to Fig. 1, the framework 1, preferably made of wood, supports two parallel guide rods 2. The treating envelop 3, made of copper, iron, or some other suitable metal, is slidably movable along the guide rods 2, the latter passing through the perforated guiding lugs 4 of the sintering envelop. A base 5, upon which the envelop 3 rests when in position, is made of some fireproof and insulating material, as asbestos-board or slate. The sintering envelop is provided with a suitable window 6, best shown in Fig. 2. In order to remove the window from the intense heat it is placed in a tubular extending portion in which a strip of mica 7 is firmly seated. The treating envelop is also provided with a handle 8. It is supported by means of a rope or flexible wire 9 running over suitable pulleys and having attached to its free ends a counter-weight 10. The envelop is supplied with gas through a tube 11, as clearly shown. The wire or rod to be sintered is held at one end by a fixed clamp 12, which is mounted on the tubular supports 13, 14, and held at its other end by a movable clamp 15 mounted on the tubular supports 16, 17. A flow of cooling fluid is maintained through the clamps. As will be more clearly explained in connection with Fig. 2, the path of flow is through tube 14, clamp 12, tube 13, connecting tube 18, tube 16, clamp 15, tube 17 and outlet tube 19. The movable clamp 15, with its attached tubes, is supported by rod 20, having attached to its lower end a float 21. This float can be conveniently made of aluminum, or in fact any other light body, and is immersed in this case in a body of mercury contained in an upright tube 22. Current is supplied to the clamp 12 by a conductor 23, which is attached to the base of the tube 13, and current is supplied to the movable clamp by means of conductor 24, which is attached to the mercury-containing tube 22, the current being conducted by the mercury to the supporting rod 20, and in turn thereby to the clamp 15.

The structure of the clamps 12 and 15 may be better understood by reference to

Fig. 2. It will be observed that the filament is held in clamp 12 between a water-cooled fixed member 25 and a movable member 26 pressed against the fixed member by means of a spring 27. The structure of the clamp with reference to the path taken by the water may be best understood by reference to Fig. 3. It will be here seen that the water entering by tube 13 takes a V-shaped course through the clamp, flowing directly against the side pressed against the heated wire, and leaves the clamp by the tube 14. Clamp 15 similarly consists of a fixed portion 29 and movable portion 30 spring-pressed against the fixed portion. The water enters the lower portion of the clamp, flows at right angles across the upper portion and then descends, leaving the clamp on the opposite side, as shown by the dotted lines.

In practice, the rod or wire to be sintered is inserted between the clamps, and the treating envelop 3 is drawn down over the same so as to rest squarely upon the plate 5. A flow of gas, such as hydrogen, is then started through the tube 11 until the air within is displaced. The rod to be sintered is gradually raised to white heat by a current from the secondary of a transformer capable of furnishing 100 or more amperes. The shrinkage of the rod causes it to draw up the movable clamp, thereby continually maintaining electrical contact at both ends without danger of rupturing the sintering wire. The progress of the sintering may be observed by the operator through the window 6, and he can regulate the current accordingly.

What I claim as new and desire to secure by Letters Patent of the United States, is,—

1. In a thermo-electric apparatus, the combination of an envelop, means for supplying a gas to said envelop, and a plurality of water-cooled clamps for holding material to be treated, at least one of said clamps being freely movable.

2. In a sintering apparatus, the combination of a container, means for supplying gas thereto, means for clamping a body to be sintered and for conducting current thereto, and means for passing a cooling fluid through said clamping and current-conducting means.

3. In a sintering apparatus, the combination of a fixed clamp, a movable clamp, means for counterbalancing the weight of said movable clamp, and means for conducting current to said clamps.

4. In a sintering apparatus, the combination of a fixed clamp, a movable clamp, a float attached to said movable clamp and supported by a liquid, and means for supplying current to said clamps.

5. In a sintering apparatus, the combination of coöperating water-cooled clamps, one of which is freely movable, electrical conductors operatively connected to said clamps, and a float immersed in a body of mercury and rigidly attached to the movable clamp for supporting the same.

In witness whereof, I have hereunto set my hand this 8th day of February, 1909.

ROBERT PALMER.

Witnesses:
  BENJAMIN B. HULL,
  HELEN ORFORD.